United States Patent [19]
Kida et al.

[11] Patent Number: 5,532,021
[45] Date of Patent: Jul. 2, 1996

[54] CHOCOLATE

[75] Inventors: Haruyasu Kida, Kitasoma-gun; Masako Arai, Tsukuba-gun; Yoichi Tashiro, Kitasoma-gun; Hideki Baba, Sennan-gun, all of Japan

[73] Assignee: Fuji Oil Company, Limited, Osaka-fu, Japan

[21] Appl. No.: 459,767

[22] Filed: Jun. 2, 1995

[30] Foreign Application Priority Data

Sep. 22, 1994 [JP] Japan .................................. 6-227851

[51] Int. Cl.$^6$ ............................................ A23G 1/00
[52] U.S. Cl. ..................... 426/607; 426/610; 426/613; 426/660
[58] Field of Search .............................. 426/601, 602, 426/607, 613, 660, 631, 610

[56] References Cited

U.S. PATENT DOCUMENTS

| | | | |
|---|---|---|---|
| 4,199,611 | 4/1980 | Toyoshima et al. | 426/607 |
| 4,465,703 | 8/1984 | Jasko et al. | 426/607 |
| 4,594,259 | 6/1986 | Baker et al. | 426/613 |
| 4,839,192 | 6/1989 | Sagi et al. | 426/607 |
| 5,210,241 | 5/1993 | Lin | 554/8 |
| 5,324,533 | 6/1994 | Cain et al. | 426/607 |
| 5,424,090 | 6/1995 | Okawauchi et al. | 426/607 |
| 5,431,948 | 7/1995 | Cain et al. | 426/607 |

*Primary Examiner*—Jennette Hunter
*Attorney, Agent, or Firm*—Wenderoth, Lind & Ponack

[57] ABSTRACT

Chocolate having excellent hardness and melting properties in the mouth upon eating at a temperature range of freezing or refrigerating is disclosed. The chocolate is subjected to tempering treatment and has a softening point of 15° to 30° C. Its fat ingredient comprises 95 to 40% by weight of fats rich in 2-unsaturated-1,3-disaturated triglycerides (SUS) the main constituent fatty acids of which are palmitic acid (P) and stearic acid (St) with a P/St ratio of at least 1.0 and 5 to 40% by weigh of lauric fats, the relation of P/St ratio of SUS to the fat content in the chocolate being on or in the higher fat content region above line 1 as shown in FIG. 1.

8 Claims, 1 Drawing Sheet

CHOCOLATE

FIELD OF THE INVENTION

The present invention relates to chocolate suitable for cooling at a low temperature range of freezing or refrigerating and eating at the same temperature range.

BACKGROUND OF THE INVENTION

It is known that chocolate is made from cacao mass, cacao butter, sugar, powdered milk and the like. Cacao butter is mainly composed of POSt, StOSt and POP glycerides wherein P is palmitic acid, O is oleic acid and St is stearic acid. Typical chocolate which is eaten as it is as sweets (hereinafter referred to as "per se chocolate sweets") contain about 32% by weight of cacao butter. The P/St ratio as an average value calculated from total constituent fatty acids of the glycerides of the cacao butter is about 0.7 to 0.8. Other fats (hard butter) are often used as substitutes for all or a part of cacao butter in order to save production cost or to improve physical properties of chocolate.

In addition to use of chocolate as solid per se chocolate sweets such as bar chocolate, tablet chocolate and the like for tasting its own flavors, tastes and physical mouthfeel, chocolate is used as raw materials of confectionery in combination with other foods, more particularly, chocolate is used as, for example, coating materials, enrobers, filling materials and decorations of iced and baked confectionery. In general, excellent flavor, taste and physical mouthfeel are severely required in the case of the former use, i.e. in the case that chocolate is used as solid per se chocolate sweets.

The above-described hard butter which is used as a cacao butter substitute is generally classified into tempering and non-tempering types.

Hard butter of a tempering type is obtained from shea butter, sal fat, illipe butter, palm oil, a fractionated oil thereof or the like. Like cacao butter, the main triglyceride composition of hard butter of this type is composed of 2-unsaturated-1,3-disaturated triglycerides (SUS). The main constituent saturated fatty acids thereof are palmitic acid (P) and stearic acid (St). Recently, as a technique for obtaining hard butter rich in SUS, enzymatic interesterification has also been pervading. Because the hard butter of this type is very similar to cacao butter structurally, it is free from problems such as blooming and lowering of heat stability caused by using it in combination with cacao butter. However, when such hard butter is used in the production of per se chocolate sweets, tempering treatment is required.

Palm medium melting point fraction is hard butter of this type and is rich in POP triglyceride. Although palm medium melting point fraction is effective for improving melting properties of chocolate using cacao butter in the mouth, the amount thereof is very small (JP-A 53-115863) because the fraction is not suitable for per se chocolate sweets, while a relatively larger amount thereof can be used for raw materials for confectionery such as a coating material, an enrober, a filling material (for example, JP-A 60-221035). In addition, there is a problem that to mix palm medium melting point fraction with triglycerides other than SUS is remarkably limited even when it is used for per se chocolate sweets (for example JP-A 61-209545).

On the other hand, typical hard butter of non-tempering type is a trans-acid type or a lauric acid type. Hard butter of a trans-acid type is obtained by isomerization and hydrogenation of a fractionated soft part of palm oil or the like, or a liquid fat such as soybean oil. Hard butter of a trans-acid type is composed of triglycerides containing relatively larger amount of trans-acids in the constituent fatty acids. On the contrary, hard butter of a lauric acid type is obtained from a fat containing a large amount of lauric acid moiety such as coconut oil, palm kernel oil, babassu oil or a fractionated oil thereof and is composed of triglycerides containing a large amount of lauric acid in the constituent fatty acids. Since hard butter of a non-tempering type does not have remarkable polymorphism, it is advantageous in that tempering treatment is not required in the production of chocolate. However, hard butter of a non-tempering type is predominantly used as a fat ingredient for chocolate to be used in the above-described combined foods because it is generally recognized to be used with cacao butter only in a limited proportion (JP-A 60-221035).

In the case of per se chocolate sweets such as bar chocolate as well as combined foods with baked confectionery, chocolate is usually eaten at a range of ordinary room temperature, i.e., about 20° C. However, in the case of a combined confectionery such as chocolate coated on ice cream, it is eaten at a temperature range of freezing. When chocolate to be eaten at the former temperature range is eaten at a temperature range of freezing or refrigerating, the mouthfeel thereof becomes hard to bite and eat, and it is difficult to melt in the mouth. In addition, when per se chocolate sweets are produced by using a conventional chocolate material mix for ice coating or the like, the resultant chocolate is unsuitable to per se chocolate sweets because it has very pasty and unpleasant mouthfeel different from conventional per se chocolate sweets such as bar chocolate and tablet chocolate.

JP-A 54-20941 discloses chocolate to be cooled and eaten at a low temperature. By rapid cooling without tempering treatment, while maintaining instable crystals, a product having a low melting point which is suitable for eating at a low temperature can be obtained, though tempering type fats are used. However, there is a limitation that the product thus obtained must be marketed in a frozen state, which is different from the marketing route of conventional per se chocolate sweets. In addition, the above-described patent application also discloses the use of the chocolate for per se chocolate sweets, but mouthfeel thereof is somewhat pasty due to the use of a liquid fat. Then, it is still required to improve physical mouthfeel, when the chocolate is used as per se chocolate sweets.

OBJECTS OF THE INVENTION

The main object of the present invention is to provide chocolate having excellent hardness and melting properties in the mouth, which is cooled and eaten at a temperature range of freezing or refrigerating. In particular, different from conventional solid per se chocolate sweets, the present invention is directed to chocolate confectionery which has an excellent physical mouthfeel without any limitation in marketing of products as required for conventional frozen combined foods. Its pasty mouthfeel is also improved.

This object as well as other objects and advantages of the present invention will become apparent to those skilled in the art from the following description with reference to the accompanying drawing.

SUMMARY OF THE INVENTION

Figure 1:
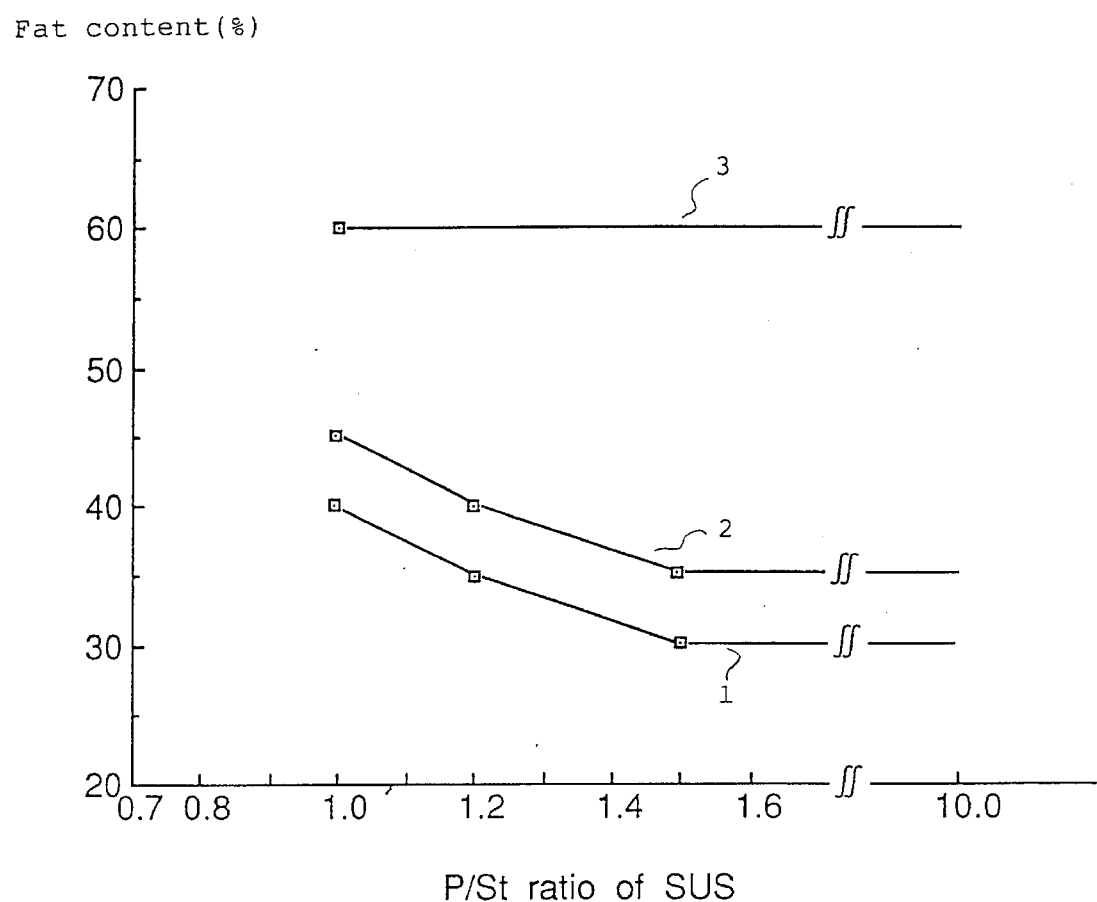
FIG. 1 is a graph showing the claimed relation between the fat content and the P/St ratio of SUS.

The present inventors have studied intensively with a conception that the limitation in marketing of products can be removed, if chocolate having physical properties suitable for eating at a low temperature is obtained even by carrying out tempering treatment. As a result, it has been found that the P/St ratio of fats of tempering type, use of lauric fats, adjustment of fat ingredient in chocolate and the like are very important factors. Thus, the present invention has been completed.

According to the present invention, there is provided chocolate subjected to tempering treatment and having a softening point of 15° to 30° C. wherein its fat ingredient comprises:

95 to 40% by weight of fats rich in 2-unsaturated -1,3-disaturated triglycerides (SUS), the main constituent fatty acids of which are palmitic acid (P) and stearic acid (St) with a P/St ratio of at least 1.0, and 5 to 40% by weigh of lauric fats, the relation of the P/St ratio of SUS to the fat content (% by weight) in the chocolate being on or in the higher fat content region above line 1 drawn by taking the points of 1.0 of P/St ratio and 40% of the fat content, 1.2 of P/St ratio and 35% of the fat content, and 1.5 of P/St ratio and 30% of the fat content in a graph plotting the fat content as ordinate and the P/St ratio as abscissa as shown in attached FIG. 1.

DETAILED DESCRIPTION OF THE INVENTION

The term "chocolate" used herein generally includes chocolate containing cacao mass and white chocolate without cacao mass. The term is not limited to chocolate containing prescribed ingredients as defined by any law.

The term "chocolate subjected to tempering treatment" used herein means chocolate having good gloss almost all SUS of which are in the form of β-type crystals. This state can be confirmed by DSC. The method for "tempering treatment" is not specifically limited. Usually, "tempering treatment" is carried out by heating a chocolate material mix to a certain extent that no crystal exists, cooling the mix to a somewhat lower temperature than the softening point of the chocolate to form fat crystals and then re-heating after detection of increase in viscosity of the mix or rise in temperature of the chocolate material mix due to release of crystallization heat. Then, only instable crystals are melted, followed by cooling, solidifying and aging of the resultant chocolate.

A softening point is measured according to the method defined by Japan Oil Chemists' Society, Standard Fats and Oils Analytical Test Methods, 2.3.4.3-86, Softening Point (Ring and Ball Method) except that the sample chocolate is treated by tempering after melting and filling it in a ring and solidifying at 5° C. for 30 minutes and that the softening point is measured after aging at 20° C. for 24 hours.

In the present invention, the softening point of chocolate should be 15° to 30° C. When the softening point is too high, excellent hardness and melting properties in the mouth upon eating it at a temperature range of freezing or refrigerating cannot be provided. Preferably, the softening point is 28° C. or lower. In order to reduce the limitation in marketing, a higher softening point is more suitable, though the softening point of the chocolate of the present invention is not lowered so much in view of the properties of the fat ingredient to be used. Preferably, the softening point is 25° C. or higher. However, when chocolate is marketed in a frozen or refrigerated state, a lower softening point may be applicable.

Preferably, the fat rich in SUS the main saturated constituent fatty acids (S) of which are palmitic acid (P) and stearic acid (St) is a fat or a fat mixture containing 40% by weight or more, preferably 50% by weight or more, more preferably 50 to 85% by weight of SUS. The U is a constituent unsaturated fatty acid and, preferably, U is oleic acid (O). The fat can be produced, for example, by using natural raw materials such as cacao butter, palm oil, shea butter, illipe butter and sal fat, synthesized fats obtained by per se known enzymatic interesterification, fractionated fats thereof and mixture thereof. It is necessary that the P/St ratio of the constituent fatty acids of SUS is at least 1.0, preferably, 1.2 to 10.0. From the economical viewpoint, as the fat rich in SUS, palm medium melting point fraction is used solely or in combination with one or more other fats rich in SUS. When the P/St ratio of constituent fatty acids of SUS is less than 1.0, the desired melting properties in the mouth of chocolate upon eating at a low temperature is not expected.

Examples of the lauric fats include known lauric fats the main constituent fatty acid of which is lauric acid such as coconut oil, palm kernel oil, babassu oil and fractionated oils of these lauric fats.

In addition, the fat ingredient of the chocolate of the present invention contains 95 to 40% by weight, more preferably, 90 to 60% by weight of the above-described rich in SUS and 5 to 40% by weight, more preferably 10 to 30% by weight of the lauric fats. When the former is too little and the latter is too much, hardness or snapping properties as per se chocolate sweets are insufficient or undesired pasty mouthfeel is come out at a relatively high fat content. When the former is too much and the latter is too little, the softening point of chocolate in which a large amount of fats rich in SUS with the P/St ratio of 1.0 or more are used cannot be lowered sufficiently and the mouthfeel as chocolate upon eating at a low temperature is too hard.

It is necessary that the fat content of the chocolate using the above-described fats is higher according to the P/St ratio. As seen from FIG. 1, the relation between the P/St ratio of SUS and the fat content (% by weight) in the chocolate should be in on or in the higher fat content region above line 1 drawn by taking the points of 1.0 of P/St ratio and 40% of the fat content, 1.2 of P/St ratio and 35% of the fat content, and 1.5 of P/St ratio and 30% of the fat content, preferably, on or in the higher fat content region above line 2 drawn by taking points of 1.0 of P/St ratio and 45% of the fat content, 1.2 of P/St ratio and 40% of the fat content, and 1.5 of P/St ratio and 35% of the fat content in the graph plotting the fat content as ordinate and the P/St ratio as abscissa. However, preferably, the fat content is not higher than 60% by weight as shown by line 3, but not below the line 1 or 2.

In the present invention, in order to further improving mouthfeel, the particularly preferred conditions other than the above are such that the P/St ratio of SUS in the fat ingredient of the chocolate is 3 or more, preferably 3 to 11. Alternatively, palm medium melting point fraction having iodine value (IV) of 40 or more, preferably 42 to 52 is used as the fat rich in SUS or a low melting fraction of lauric fats is used as the lauric fat regardless of the P/St ratio of SUS in the fat ingredient of the chocolate.

For obtaining the P/St ratio of 3 or more in SUS in the fat ingredient of the chocolate, use of cacao butter or other SUS type hard butter rich in StOSt is controlled. Normally, iodine value (IV) of palm medium melting point fraction used as conventional hard butter is in a range of 30 to 35. However, wide variety of lauric fats can be used, when palm medium melting point fraction having a relatively high IV is used.

The chocolate of the present invention can be produced according to a conventional method. Whole powdered milk can be used as a raw material in the case of milk chocolate or white chocolate and therefore milk fat can be included in the fat ingredient (20% by weight or less in the fat ingredient). In addition, it is possible to add a small amount of a low melting point fat, for example, a fat which is liquid at ordinary room temperature or the like in so far as the desired physical properties are maintained.

As described hereinabove, the chocolate obtained by the present invention has excellent hardness and melting properties in the mouth at a temperature range of freezing and refrigerating. This has not been able to obtain in conventional frozen or refrigerated chocolate.

The following examples and comparative examples further illustrate the present invention in detail. However, they are not to be construed to limit the scope of the present invention. In the following Examples and Comparative Examples, all the "parts" and "percents" are by weight.

Examples 1 to 7 and Comparative Examples 1 to 5.

According to the formulations as shown in Table 1-1 or Table 1-2, cacao butter, palm medium melting point fraction (PMF)(IV =34.0 and elevated melting point=30.0° C., or IV=45.0 and open tube melting point (slipping point of A.O.C.S. Official Method, Cc 3-25) = 26.0° C.), a lauric fat (a palm kernel low melting point fraction: palm kernel olein having IV of 25.0 and open tube melting point 21° C., or coconut oil having IV of 8.5 and open tube melting point 24.1° C.) were melted and mixed together. Then, lecithin was added to the mixture to prepare an fat phase. On the other hand, cacao mass, whole powdered milk and sugar were mixed together and then a part of the above fat phase was added to the mixture. The mixture was subjected to roll-refining and conching treatment at 50° C. The remaining fat phase was admixed to the mixture.

TABLE 1-1

Formulations of chocolate of Examples 1–7 (parts)

| Ingredients | Example Nos. | | | | | | |
|---|---|---|---|---|---|---|---|
| | 1 | 2 | 3 | 4 | 5 | 6 | 7 |
| Cacao mass | 15.0 | 15.0 | 15.0 | 15.0 | 15.0 | 0.0 | 15.0 |
| Whole powdered milk | 20.0 | 20.0 | 15.0 | 20.0 | 10.0 | 30.0 | 20.0 |
| Sugar | 40.0 | 35.0 | 35.0 | 45.0 | 25.0 | 35.0 | 34.0 |
| Cacao butter | 0.0 | 10.0 | 15.0 | 0.0 | 20.0 | 0.0 | 12.0 |
| PMF (IV 34) | 15.0 | 0.0 | 0.0 | 15.0 | 20.0 | 30.0 | 0.0 |
| PMF (IV 45) | 0.0 | 10.0 | 16.0 | 0.0 | 0.0 | 0.0 | 9.0 |
| Palm kernel olein | 10.0 | 10.0 | 0.0 | 5.0 | 10.0 | 0.0 | 10.0 |
| Palm oil | 0.0 | 0.0 | 4.0 | 0.0 | 0.0 | 5.0 | 0.0 |
| Lecithin | 0.4 | 0.4 | 0.4 | 0.4 | 0.4 | 0.4 | 0.4 |
| Flavor | pq | pq | pq | pq | pq | pq | pq | pq: proper quantity

TABLE 1-2

Formulations of chocolate in Comparative Examples 1–5 (part)

| Ingredients | Comparative Examples Nos. | | | | |
|---|---|---|---|---|---|
| | 1 | 2 | 3 | 4 | 5 |
| Cacao mass | 15.0 | 15.0 | 15.0 | 15.0 | 15.0 |
| Whole powdered milk | 20.0 | 20.0 | 15.0 | 15.0 | 20.0 |
| Sugar | 40.0 | 40.0 | 35.0 | 35.0 | 45.0 |
| Cacao butter | 25.0 | 15.0 | 15.0 | 5.0 | 9.0 |
| PMF (IV = 45) | 0.0 | 0.0 | 18.0 | 10.0 | 6.0 |
| Palm kernel olein | 0.0 | 10.0 | 0.0 | 20.0 | 5.0 |
| Palm oil | 0.0 | 0.0 | 2.0 | 0.0 | 0.0 |
| Lecithin | 0.4 | 0.4 | 0.4 | 0.4 | 0.4 |
| Flavor | pq | pq | pq | pq | pq | pq: proper quantity

The fat composition in the raw fat material is shown in Table 2. In Table 2, the fat ingredient (%) is the amount of the fat ingredient in the chocolate material mix and the amounts of SUS and lauric fats are those in the fat ingredient of the chocolate. The analysis of SUS component was carried out by using high performance liquid chromatography. The P/St ratio is that of constituent fatty acids of SUS.

TABLE 2

| | fat ingredient (%) | Fat composition | | | | |
|---|---|---|---|---|---|---|
| | | POP | POS | SOS | P/St | lauric fats |
| Ex. 1 | 38.4 | 29.2% | 9.5% | 6.4% | 3.04 | 26.0% |
| Ex. 2 | 43.5 | 18.8 | 18.7 | 11.0 | 1.38 | 23.0 |
| Ex. 3 | 47.2 | 25.5 | 22.9 | 13.1 | 1.51 | 8.4 |
| Ex. 4 | 33.5 | 33.5 | 15.4 | 7.0 | 2.80 | 14.9 |
| Ex. 5 | 60.9 | 24.4 | 20.0 | 12.3 | 1.54 | 16.4 |
| Ex. 6 | 42.8 | 45.6 | 9.9 | 1.3 | 8.14 | 11.7 |
| Ex. 7 | 44.5 | 17.6 | 21.3 | 13.0 | 1.20 | 15.0 |
| Comp. Ex. 1 | 38.4 | 15.4 | 31.8 | 21.7 | 0.83 | 0.0 |
| Comp. Ex. 2 | 38.4 | 11.0 | 22.2 | 15.0 | 0.81 | 26.0 |
| Comp. Ex. 3 | 47.2 | 27.6 | 21.6 | 13.2 | 1.60 | 4.2 |
| Comp. Ex. 4 | 47.2 | 15.4 | 12.2 | 7.5 | 1.58 | 42.4 |
| Comp. Ex. 5 | 33.4 | 17.8 | 21.3 | 13.0 | 1.20 | 15.0 |

The underline in Table 2 shows outside of the claimed range.

After tempering treatment of the chocolate material mix obtained as described above, the mix was placed in a mold. After cooling at a cold temperature range of about 5° C. for 30 minutes, the resultant chocolate was released from the mold. Hardness and mouthfeel of the chocolate were estimated organoleptically at temperature ranges of freezing (−20° C.) and refrigerating (5° C.). The results are shown in Table 3.

TABLE 3

Results of estimation

| | Softening point (°C.) | Mouthfeel | |
|---|---|---|---|
| | | at freezing | at refrigerating |
| Ex. 1 | 27.0 | excellent | excellent |
| Ex. 2 | 26.0 | excellent | excellent |

TABLE 3-continued

Results of estimation

| | Softening point (°C.) | Mouthfeel at freezing | Mouthfeel at refrigerating |
| --- | --- | --- | --- |
| Ex. 3 | 27.2 | good | excellent |
| Ex. 4 | 28.0 | good | good |
| Ex. 5 | 26.0 | good (somewhat oily) | good (somewhat oily) |
| Ex. 6 | 27.0 | excellent | excellent |
| Ex. 7 | 27.5 | excellent | excellent |
| Comp. Ex. 1 | 33.0 | bad (hard, bad melting in mouth) | bad (bad melting in mouth) |
| Comp. Ex. 2 | 27.0 | bad (pasty) | not good (pasty) |
| Comp. Ex. 3 | 26.5 | not good (pasty) | not good (pasty) |
| Comp. Ex. 4 | 23.0 | not good (soft) | bad (soft) |
| Comp. Ex. 5 | 27.5 | not good (hard) | not good (hard) |

As seen from Table 2, it has been confirmed that chocolate containing SUS having the P/St ratio of 1 or more and the high fat content according to the P/St ratio and the fat ingredient of which contains 5 to 40% of lauric fats shows excellent hardness and melting properties in the mouth at temperature ranges of freezing and refrigerating. On the other hand, chocolate other than the above is unsuitable to be eaten at temperature ranges of freezing and refrigerating because it has pasty melting properties in the mouth and too hard or too soft mouthfeel.

As described hereinabove, according to the present invention, it is possible to obtain solid chocolate which has excellent hardness and melting properties in the mouth upon eating at temperature ranges of freezing and refrigerating. Thus, the present invention contributes to development in new chocolate market.

What is claimed is:

1. Chocolate subjected to tempering treatment and having a softening point of 15° to 30° C., wherein its fat ingredient comprises:

95 to 40% by weight of fats rich in 2-unsaturated-1,3-disaturated triglycerides (SUS) the main constituent fatty acids of which are palmitic acid (P) and stearic acid (St) with a P/St ratio of at least 1.0 and 5 to 40% by weight of lauric fats, the relation of P/St ratio of SUS to the fat content (% by weight) in the chocolate being on or in the higher fat content region above the line drawn by taking the points of 1.0 of the P/St ratio and 40% of the fat content, 1.2 of the P/St ratio and 35% of the fat content, and 1.5 of the P/St ratio and 30% of the fat content in a graph plotting the fat content as ordinate and the P/St ratio as abscissa.

2. The chocolate according to claim 1, wherein the relation of P/St ratio of SUS to the fat content in the chocolate being on or in the higher fat content region above the line drawn by taking the points of 1.0 of the P/St ratio and 45% of the fat content, 1.2 of the P/St ratio and 40% of the fat content, and 1.5 of the P/St ratio and 35% of the fat content in a graph plotting the fat content as ordinate and the P/St ratio as abscissa.

3. The chocolate according to claim 1, wherein the fat content of the chocolate is not higher than 60% by weight, but not lower than 30% by weight.

4. The chocolate according to claim 1, wherein the P/St ratio of SUS in the fat ingredient of the chocolate is at least 3.

5. The chocolate according to claim 4, wherein the P/St ratio of SUS in the fat ingredient of the chocolate is 3 to 10.

6. The chocolate according to claim 1, wherein palm medium melting point fraction having an iodine value of at least 40 is used as the fat rich in SUS.

7. The chocolate according to claim 6, wherein the iodine value of palm medium melting point fraction is 42 to 52.

8. The chocolate according to claim 1, wherein a low melting point fraction of lauric fats is used as the lauric fat.

* * * * *